(12) United States Patent
Derrick

(10) Patent No.: US 6,279,943 B1
(45) Date of Patent: Aug. 28, 2001

(54) STEERING WHEEL WITH AIRBAG GUIDE

(75) Inventor: John Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/601,400

(22) PCT Filed: Feb. 12, 1999

(86) PCT No.: PCT/EP99/00926

§ 371 Date: Aug. 2, 2000

§ 102(e) Date: Aug. 2, 2000

(87) PCT Pub. No.: WO99/41112

PCT Pub. Date: Aug. 19, 1999

(30) Foreign Application Priority Data

Feb. 13, 1998 (DE) .......................................... 298 02 471 U

(51) Int. Cl.$^7$ ................................................ B60R 21/16
(52) U.S. Cl. ........................................ 280/728.2; 280/731
(58) Field of Search ................................ 280/728.2, 731; 200/61.55

(56) References Cited

U.S. PATENT DOCUMENTS

| | | | |
|---|---|---|---|
| 5,228,362 | * 7/1993 | Chen et al. | 74/552 |
| 5,480,184 | 1/1996 | Young . | |
| 5,508,481 | * 4/1996 | Williams et al. | 200/61.54 |
| 5,593,178 | * 1/1997 | Shiga et al. | 280/731 |
| 5,738,369 | * 4/1998 | Durrani | 280/731 |
| 5,931,492 | * 8/1999 | Mueller et al. | 280/728.2 |

FOREIGN PATENT DOCUMENTS

| | | |
|---|---|---|
| 19625722 | 1/1998 | (DE) . |
| WO9815431 | 4/1998 | (WO) . |

\* cited by examiner

Primary Examiner—Paul N. Dickson
(74) Attorney, Agent, or Firm—Tarrolli, Sundheim, Covell, Tummino & Szabo L.L.P.

(57) ABSTRACT

A guide is proposed for a steering wheel comprising a steering wheel skeleton consisting of hub, spokes and steering wheel rim and an airbag module housed therein, which for actuation of the horn is displaceably disposed against a return force by the required contact path parallel to the steering wheel axis, which guide is characterized in that at least three guiding points (2) are provided in a manner distributed in the circumferential direction in a pot-shaped steering wheel skeleton (1) and that a pot-shaped guiding metal sheet (4) which is U-shaped in cross-section and open to the bottom is embodied on or attached to a generator support (3) of the airbag module (5).

6 Claims, 1 Drawing Sheet

STEERING WHEEL WITH AIRBAG GUIDE

Figure 1:
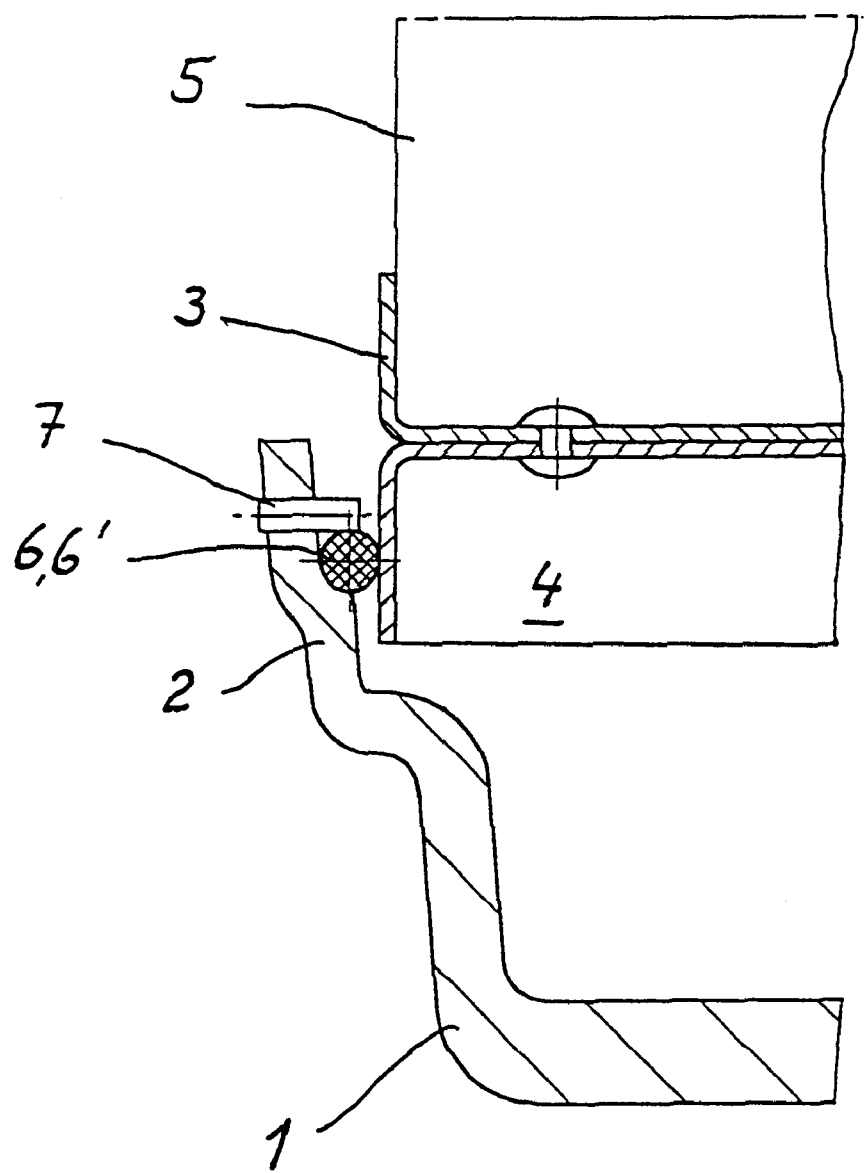

The invention relates to a steering wheel comprising a pot-shaped steering wheel skeleton consisting of hub, spokes and steering wheel rim and an airbag module housed therein, which for actuation of the horn is displaceably arranged against a return force by the required contact path parallel to the steering wheel axis.

In such steering wheels as known from DE-A-196 25 722, for example, the airbag modules can be connected with the steering wheel in very differing ways. If as usually common the steering wheel is to be placed onto the steering column and attached thereto by means of a central nut, the air bag modules cannot be installed until the steering wheel has been mounted, which is often considered disadvantageous because of the final assembly time required for this purpose. In addition, although the airbag modules can be inserted from the front side of the steering wheels, they have to be attached from the rear side of the steering wheel because fasteners are not desired on the front side of the steering wheel for optical reasons.

As regards the steering wheel attachment recently aimed at with respect to the shortest possible final assembly times, in which steering wheel and airbag module form a mounting unit, one or several fasteners must be provided for connecting the steering wheel with the steering column on the rear side of the steering wheel, which although this is possible according to the design, is accompanied by more or less major difficulties during the mounting because the space available for manipulating the fasteners is usually very limited behind the steering wheel. Additional problems will result if the airbag module has to be displaceably arranged against a return force by the required contact path parallel to the steering wheel axis for actuation of the horn.

Various solutions have already become known for such airbag attachments as well. However, irrespective of the kind of steering wheel attachment there is, in all cases, the problem that the airbag module can be guided in a plane perpendicular to the actuation direction only by means of very complicated designs such that operationally reliable contact-making can be guaranteed for the horn and that the movement gap required between the cover of the airbag module and the steering wheel environment is not irregular thus being an optical nuisance.

Therefore, the object is to show for airbag modules which are housed in steering wheels and which for actuation of the horn have to be movable in the direction of the steering wheel axis, a possibility permitting safe guidance of the airbag module as regards all directions perpendicular to the horn actuation direction, i.e. in an X-Y plane, with the simplest possible means, without impairing the possible movements in the direction perpendicular to this plane (Z direction).

In order to achieve this object, it is proposed according to the invention in connection with a steering wheel of the initially mentioned kind that at least three guiding points are provided in a manner distributed in the circumferential direction in a pot-shaped steering wheel skeleton and that a pot-shaped guiding metal sheet which is U-shaped in cross-section and open to the bottom is embodied on or attached to a generator support of the airbag module.

The pot-shaped guiding metal sheet embodied on or attached to the generator support can be designed in such a stable manner that no elastic deformation can take place with all of the forces usually occurring in the X-Y plane, so that the allocation of the horn contacts is ensured and no optically annoying displacements of the airbag cover relative to the steering wheel environment can occur on the surface of the steering wheel.

The pot-shaped guiding metal sheet has to face in the steering wheel skeleton at least three guiding points distributed in the circumferential direction so as to be able to avoid relative motions between airbag module and steering wheel in the X-Y plane. Of course, it is also possible to provide more than three guiding points or even a guide surrounding on all sides.

Correspondingly, the guiding points may consist of plastic elements attached to the steering wheel skeleton or be made of a plastic ring continuous in the circumferential direction. On the other hand, it will be possible to provide a plurality of recesses in a manner distributed across the circumference of the side wall in the pot-shaped guiding metal sheet if this is desired to save weight. The plastic elements and the plastic ring, respectively, are attached to the steering wheel skeleton advantageously by means of retaining pins.

Further particulars are explained in more detail by means of the embodiment shown in FIG. 1.

FIG. 1 shows a vertical partial section through a steering wheel skeleton 1 and an airbag module 5 housed in a generator support 3 to which a pot-shaped guiding metal sheet 4 which is U-shaped in cross-section and open to the bottom is riveted. At least 3 guiding points 2 are provided in a manner distributed in the circumferential direction at the steering wheel skeleton 1, which points lie opposite the cylindrical wall of the pot-shaped guiding metal sheet. A plastic element 6 is positioned between the guiding point 2 and the guiding metal sheet 4 in the steering wheel skeleton 1 and attached by means of the pin 7. A plastic material having good friction properties is advantageously used so that no additional lubricants are required for the relative motion occurring between the guiding plate sheet 4 and the plastic element 6 when the horn is actuated.

Instead of individual guiding points and plastic elements, all arranged in a manner distributed in the circumferential direction, the guiding point and/or the plastic element can be configured continuously in the circumferential direction, i.e. the plastic element may consist of a plastic ring 6'.

As regards the pretension of the airbag module against the direction of actuation of the horn it is possible to depend on known and time-tested design elements such as coil or leaf springs, without having to abandon the fundamental principle of the inventive concept. The proposed guide for the airbag module can be manufactured very simply, attached easily and be made in a very space-saving and weight-saving manner.

What is claimed is:

1. A steering wheel comprising a pot-shaped steering wheel skeleton (1) consisting of a hub, spokes and a steering wheel rim and an airbag module (5) housed therein, which for actuation of a horn is displaceably arranged against a return force for movement on a contact path parallel to the steering wheel axis, characterized in that at least three guiding points (2) are provided in a manner distributed in a circumferential direction in the steering wheel skeleton (1) and that a pot-shaped guiding metal sheet (4) which is U-shaped in cross-section and open in a direction facing away from the airbag module is connected with a generator support (3) of the airbag module (5).

2. The steering wheel according to claim 1, characterized in that the guiding points (2) consist of plastic elements (6) attached in the steering wheel skeleton (1).

3. The steering wheel according to claim 1, characterized in that the guiding points (2) are formed by a plastic ring (6') continuous in the circumferential direction and-attached in the steering wheel skeleton (1).

4. The steering wheel according to claim 3, characterized in that a plurality of recesses is provided in a manner distributed across the circumference of a side wall of the pot-shaped guiding metal sheet (4).

5. The steering wheel according to claim 2 characterized in that the plastic elements (6) are attached to the steering wheel skeleton (1) by means of retaining pins (7).

6. The steering wheel according to claim 3 characterized in that the plastic ring (6') is attached to the steering wheel skeleton (1) by means of retaining pins (7).

* * * * *